United States Patent
Motohashi et al.

(10) Patent No.: US 10,153,526 B2
(45) Date of Patent: Dec. 11, 2018

(54) ASSEMBLED BATTERY

(71) Applicant: CALSONIC KANSEI CORPORATION, Saitama-shi, Saitama (JP)

(72) Inventors: Toshiyuki Motohashi, Saitama (JP); Takashi Otsuka, Saitama (JP); Satoshi Sakuma, Saitama (JP); Tatsunari Kawaguchi, Saitama (JP); Hitoshi Shimonosono, Yokohama (JP); Yoshito Sonou, Yamato (JP); Tomoyuki Hanada, Yamato (JP)

(73) Assignee: CALSONIC KANSEI CORPORATION, Saitama-shi (JP)

( * ) Notice: Subject to any disclaimer, the term of this patent is extended or adjusted under 35 U.S.C. 154(b) by 385 days.

(21) Appl. No.: 14/905,196

(22) PCT Filed: Jun. 12, 2014

(86) PCT No.: PCT/JP2014/065658
§ 371 (c)(1),
(2) Date: Jan. 14, 2016

(87) PCT Pub. No.: WO2015/008563
PCT Pub. Date: Jan. 22, 2015

(65) Prior Publication Data
US 2016/0141735 A1    May 19, 2016

(30) Foreign Application Priority Data

Jul. 17, 2013 (JP) .................................. 2013-148414

(51) Int. Cl.
*H01M 10/6554* (2014.01)
*H01M 2/10* (2006.01)
(Continued)

(52) U.S. Cl.
CPC ..... *H01M 10/6554* (2015.04); *H01M 2/1077* (2013.01); *H01M 10/613* (2015.04);
(Continued)

(58) Field of Classification Search
CPC combination set(s) only.
See application file for complete search history.

(56) References Cited

U.S. PATENT DOCUMENTS 5,510,208 A * 4/1996 Hall ..................... H01M 2/1077
429/120
6,131,646 A * 10/2000 Kelley ..................... B64G 1/50
165/185

(Continued)

FOREIGN PATENT DOCUMENTS

CN 102738538 A 10/2012
JP 2010-192207 A 9/2010
(Continued)

*Primary Examiner* — Ula C Ruddock
*Assistant Examiner* — Amanda J Barrow
(74) *Attorney, Agent, or Firm* — Foley & Lardner LLP

(57) ABSTRACT

A battery unit, a bottomed case, a plate-shaped cooling plate, and first heat transfer material are included. The cooling plate is fastened to a bottom part of the case from the outside of the case, and can cool the battery unit via the bottom part of the case. The first heat transfer material have a plastic property and are held between the bottom part of the case and the cooling plate. The bottom part of the case has heat transfer material housings that house excess first heat transfer material therein when the cooling plate has been fastened to the case.

5 Claims, 3 Drawing Sheets

(51) Int. Cl.
H01M 10/613 (2014.01)
H01M 10/625 (2014.01)
H01M 10/6556 (2014.01)

(52) U.S. Cl.
CPC ..... H01M 10/625 (2015.04); H01M 10/6556 (2015.04); *H01M 2/1016* (2013.01); *H01M 2220/20* (2013.01)

(56) References Cited

U.S. PATENT DOCUMENTS

| | | | | |
|---|---|---|---|---|
| 2009/0142628 A1* | 6/2009 | Okada | .................. | H01M 2/0237 429/8 |
| 2009/0208829 A1* | 8/2009 | Howard | .............. | F28D 15/0233 429/120 |
| 2010/0015512 A1* | 1/2010 | Inoue | .................... | H01M 2/206 429/99 |
| 2011/0075377 A1* | 3/2011 | Paquette | ............ | H05K 7/20509 361/709 |
| 2011/0206948 A1 | 8/2011 | Asai et al. | | |
| 2011/0300428 A1* | 12/2011 | Sohn | .................. | H01M 2/1066 429/120 |
| 2011/0318626 A1* | 12/2011 | Bartenschlager | .. | B60H 1/00278 429/120 |
| 2012/0001309 A1 | 1/2012 | Soyano | | |
| 2012/0009455 A1* | 1/2012 | Yoon | .................. | H01M 10/653 429/120 |
| 2012/0100399 A1* | 4/2012 | Adachi | .................. | B60L 11/18 429/7 |
| 2012/0121959 A1* | 5/2012 | Yamada | .................. | B60K 1/04 429/100 |
| 2012/0148889 A1* | 6/2012 | Fuhr | .................. | H01M 2/1077 429/87 |
| 2012/0177960 A1* | 7/2012 | Tasai | .................. | B60H 1/00278 429/72 |
| 2012/0261107 A1* | 10/2012 | Prinz | .................. | H01M 2/1083 165/185 |
| 2012/0263983 A1* | 10/2012 | Yoon | .................. | H01M 2/1077 429/82 |
| 2012/0312614 A1* | 12/2012 | Fujiwara | ............ | H01M 2/1077 180/68.5 |
| 2013/0004822 A1* | 1/2013 | Hashimoto | ......... | H01M 2/1072 429/120 |
| 2015/0044538 A1 | 2/2015 | Katayama et al. | | |

FOREIGN PATENT DOCUMENTS

| | | |
|---|---|---|
| JP | 2011-023296 A | 2/2011 |
| JP | 2011-049139 A | 3/2011 |
| JP | 2011-175743 A | 9/2011 |
| JP | 2012-015349 A | 1/2012 |
| JP | 2013-012441 A | 1/2013 |
| WO | WO 2012/118015 A1 | 9/2012 |
| WO | WO-2013/002090 A1 | 1/2013 |
| WO | WO-2013/084937 A1 | 6/2013 |

* cited by examiner

ASSEMBLED BATTERY

TECHNICAL FIELD

The present invention relates to an assembled battery including a plurality of battery cells housed in a casing.

BACKGROUND ART

An assembled battery made by assembling a plurality of single batteries (battery cells) is known. Each battery cell generates heat through charge and discharge. In order to maintain the charge-discharge characteristics, it is necessary to appropriately control the temperature of the battery cells.

JP 2010-192207A and JP 2011-49139A disclose such an assembled battery including a plate-shaped support member that supports the supported surfaces of a plurality of single batteries, and cooling devices composed of a Peltier element and the like for cooling the support member.

JP 2011-23296A discloses provision of a heat conductive material between single batteries and an assembled battery mount on which an assembled battery is mounted. The heat conductive material is a sheet, elastic rubber, a paste, or a gel.

SUMMARY OF INVENTION

Configurations of the conventional techniques described in the aforementioned patent documents are such that the heat of single batteries is transferred to the outside via a support member, such as a case, provided at a bottom side of the single batteries. According to such configurations, this heat is cooled from the outside of the case.

A heat conductive material having an elastic or plastic property is interposed between the single batteries and the case for the purpose of increasing the efficiency of heat conduction, as with the conventional technique described in JP 2011-23296A.

In this configuration, if a battery unit made by stacking the single batteries is fastened to the case, the battery unit is pressed against the case, and thus the heat conductive material is pressed. As the heat conductive material is pressed by the battery unit, the heat conductive material deforms.

Deformation of the heat conductive material between the battery unit and the case may result in uneven distribution of the heat conductive material between the battery unit and the case. Uneven distribution of the heat conductive material gives rise to the possibility that an excessive force is applied to a part of the case due to uneven pressing forces between the battery unit and the case. This could possibly create a problem with the strength and durability of the case.

Uneven pressing forces between the battery unit and the case gives rise to the possibility that the heat conductive material cannot achieve a desired compression rate. This could possibly reduce the efficiency of heat conduction between the battery unit and the case, and lead to the failure to achieve a desired cooling performance.

The present invention has been designed in consideration of the problems described above, and an object thereof is to provided an assembled battery that can ensure not only the strength and durability of a case, but also the efficiency of heat conduction.

According to one aspect of the present invention, a battery unit including stacked battery modules, each battery module including a plurality of battery cells, a case for housing the battery unit therein, the case having a bottom part, a plate-shaped cooling plate, and first heat transfer material are included, the cooling plate is fastened to the bottom part of the case from the outside of the case, and cools the battery unit via the bottom part of the case. The first heat transfer material have a plastic property and are held between the bottom part of the case and the cooling plate. The bottom part of the case has heat transfer material housings that house excess first heat transfer material therein when the cooling plate is fastened to the case.

DESCRIPTION OF EMBODIMENTS

Embodiments of the present invention will be described below with reference to the drawings.

Figure 1:
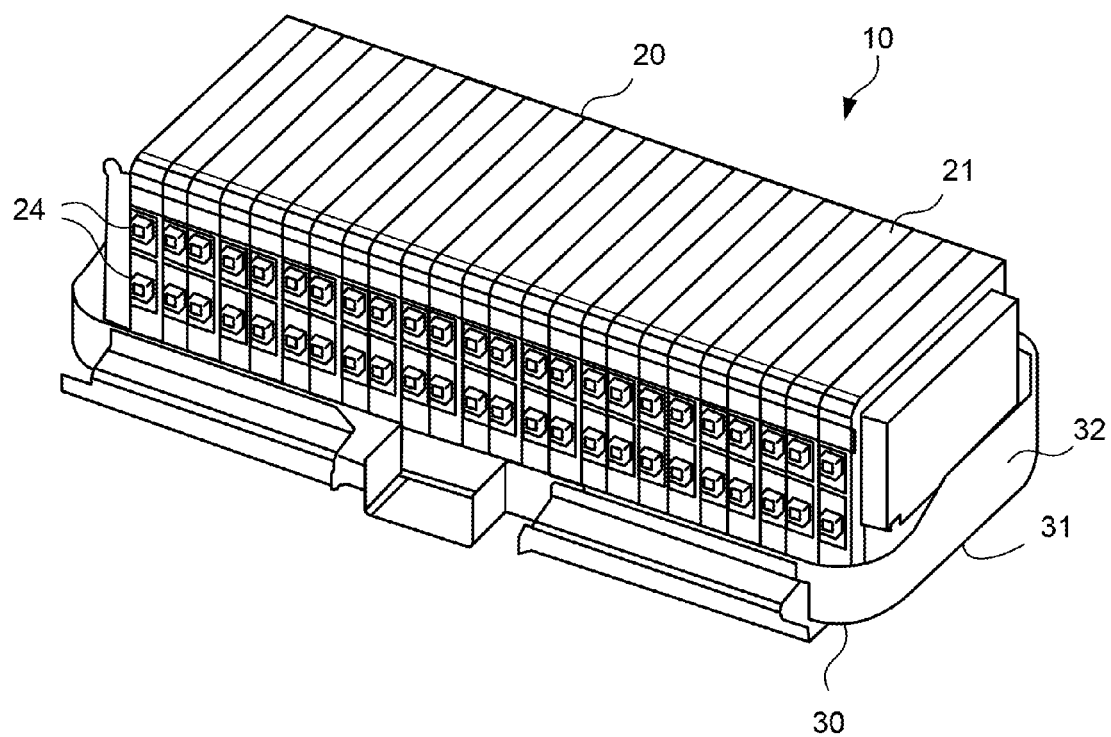
FIG. 1 is a perspective view of an assembled battery according to an embodiment of the present invention.

FIG. 1 is a perspective view of an assembled battery 10 according to the embodiment of the present invention.

The assembled battery 10 is composed of a battery unit 20 accommodated in a case 30. The case 30 has a bottom part 31 and a side part 32 that stands so as to enclose a peripheral portion of the bottom part 31. Although not illustrated, a cover part that covers the case from above is provided over the case 30.

The battery unit 20 is composed of a plurality of stacked battery modules 21. As will be described later with reference to FIG. 3, each battery module 21 is composed of a plurality of battery cells 22, and is surrounded by a battery case 23.

Each battery cell 22 is composed of, for example, a secondary battery that can be charged and discharged, such as a lithium-ion battery and a nickel-hydrogen battery. Each battery module 21 is composed of a plurality of battery cells 22. The battery unit 20 is composed of a large number of battery modules 21 stacked in series. The battery modules 21 are fastened together by bolts and the like along a stacking direction.

Figure 2:
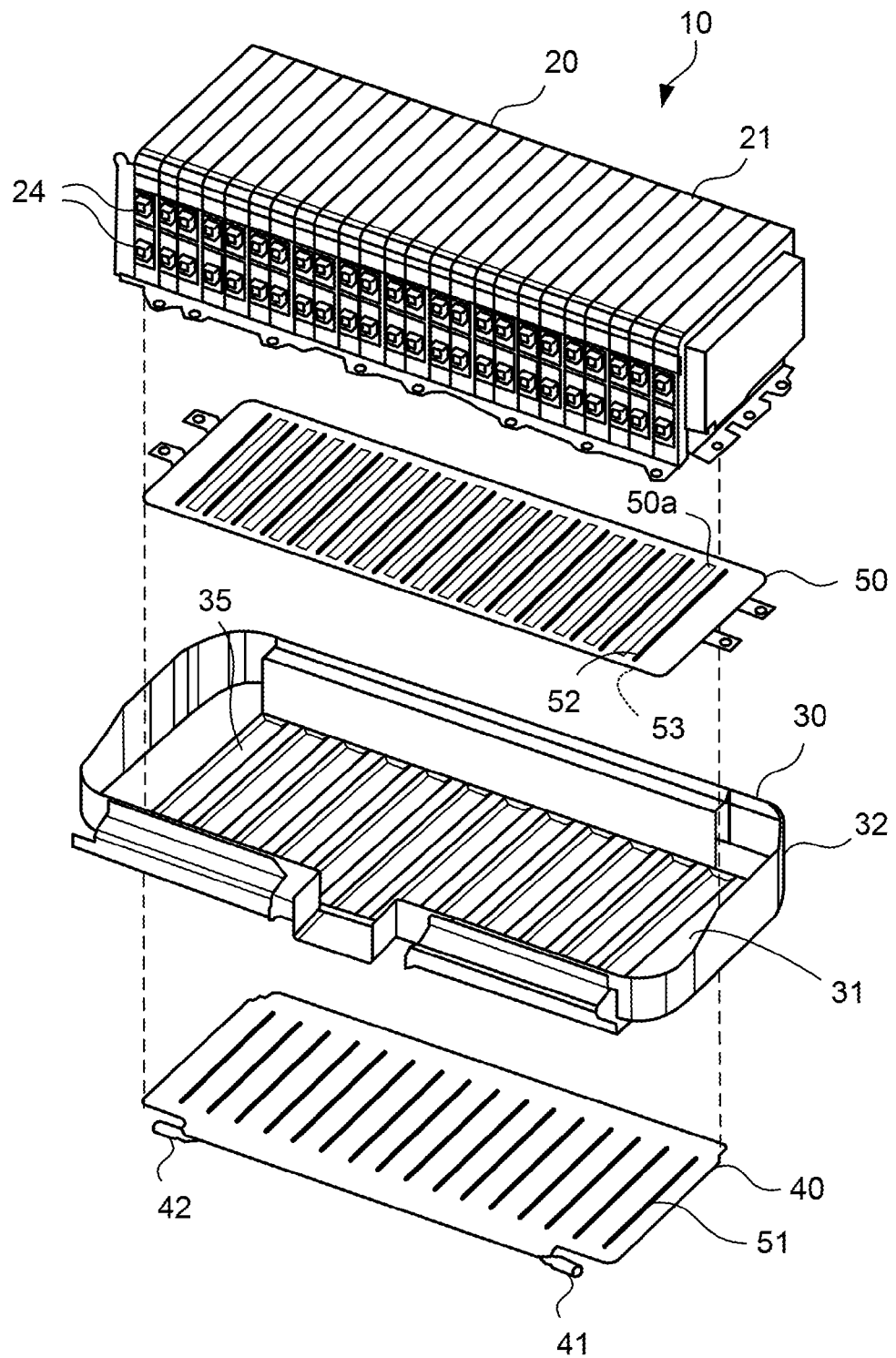
FIG. 2 is an disassembled perspective view of the assembled battery according to the embodiment of the present invention.

FIG. 2 is an disassembled perspective view of the assembled battery 10 according to the embodiment of the present invention.

The assembled battery 10 is made by placing the battery unit 20 into the case 30 without a lid as shown in FIG. 2. A cooling plate 40 for cooling the battery unit 20 is provided to an outer side of the bottom part 31 of the case 30.

The cooling plate 40 is structured such that a medium flows thereinside. As the medium conducts heat away from the battery unit 20, the cooling plate 40 cools the battery unit 20 such that the temperature of the battery unit 20 does not rise beyond necessity. Also, as the medium applies heat to the battery unit 20, the cooling plate 40 heats the battery unit 20 such that the temperature of the battery unit 20 does not drop beyond necessity. For example, two metallic plates that have been bent to form a flow passage for the medium on an inner side thereof are used as the cooling plate 40. The cooling plate 40 is formed by brazing outer peripherals of the two metallic plates. The cooling plate 40 has a medium inlet 41 and a medium outlet 42.

The cooling plate 40 controls the heat of the battery unit 20 via an outer side of the case 30. First heat transfer material 51, second heat transfer material 52, third heat transfer material 53, and a heat conductive plate 50 are provided so as to increase the efficiency of heat conduction without leaving any gap between the battery unit 20 and the case 30, and between the case 30 and the cooling plate 40.

Specifically, the heat conductive plate 50 is made of a metallic material having a high heat conductive property (e.g., aluminum), and is interposed between the battery unit 20 and the case 30. The second heat transfer material 52 are interposed between the heat conductive plate 50 and the battery unit 20. The third heat transfer material 53 are interposed between the heat conductive plate 50 and the bottom part 31 of the case 30. The first heat transfer material 51 are interposed between the outer side of the bottom part 31 of the case 30 and the cooling plate 40.

The first heat transfer material 51, the second heat transfer material 52, and the third heat transfer material 53 increase heat conductivity by filling gaps between the outer side of the bottom part 31 of the case 30 and the cooling plate 40, between the battery unit 20 and the heat conductive plate 50, and between the heat conductive plate 50 and the case 30.

The first heat transfer material 51, the second heat transfer material 52, and the third heat transfer material 53 are composed of, for example, elastic resin (e.g., silicone) and a filler of a metallic or similar material that increases heat conduction. They eliminate an air layer by coming in tight contact with a target object, and increase a heat conductive property with the help of high heat conductivity of the materials thereof.

The assembled battery 10 is made by placing the battery unit 20 and the heat conductive plate 50 into the case 30, fastening them together with bolts and the like, and further fastening the cooling plate 40 to the outer side of the bottom part 31 of the case 30 with bolts and the like. The second heat transfer material 52 are interposed between the battery unit 20 and the heat conductive plate 50. The third heat transfer material 53 are interposed between the heat conductive plate 50 and the bottom part 31 of the case 30. The first heat transfer material 51 are interposed between the bottom part 31 of the case 30 and the cooling plate 40. Such a configuration improves the efficiency of heat conduction between the battery unit 20 and the cooling plate 40, and allows for appropriate control of the temperature of the battery unit 20 with the aid of the medium flowing inside the cooling plate 40.

In a case where the assembled battery 10 is configured in the above-described manner, the following problems arise.

The first heat transfer material 51, the second heat transfer material 52, and the third heat transfer material 53 are compressed when fastening together the battery unit 20, the heat conductive plate 50, the bottom part 31 of the case 30, and the cooling plate 40. Between the battery unit 20 and the heat conductive plate 50, there is room for the pressed second heat transfer material 52 to enter gaps between the battery modules 21.

Meanwhile, the third heat transfer material 53 between the heat conductive plate 50 and the case 30, as well as the first heat transfer material 51 between the case 30 and the cooling plate 40, are pressed when fastening the battery unit 20. At this time, if excess third heat transfer material 53 and excess first heat transfer material 51 become uneven, uneven forces are applied especially to the case 30 that is interposed between the third heat transfer material 53 and the first heat transfer material 51. Such uneven forces have a possibility of causing deformation of the case 30, and the deformation of the case 30 has a possibility of reducing the strength and durability of the case 30. Uneven forces between the battery unit 20 and the case 30 could possibly prevent the third heat transfer material 53 and the first heat transfer material 51 from achieving a desired compression rate, and hence could possibly reduce the efficiency of heat conduction between the battery unit 20 and the cooling plate 40.

In view of this, the embodiment of the present invention incorporates the following configuration to prevent unevenness in the second heat transfer material 52 and the first heat transfer material 51, a reduction in the strength and durability of the case 30, and a reduction in the efficiency of heat conduction.

Figure 3:
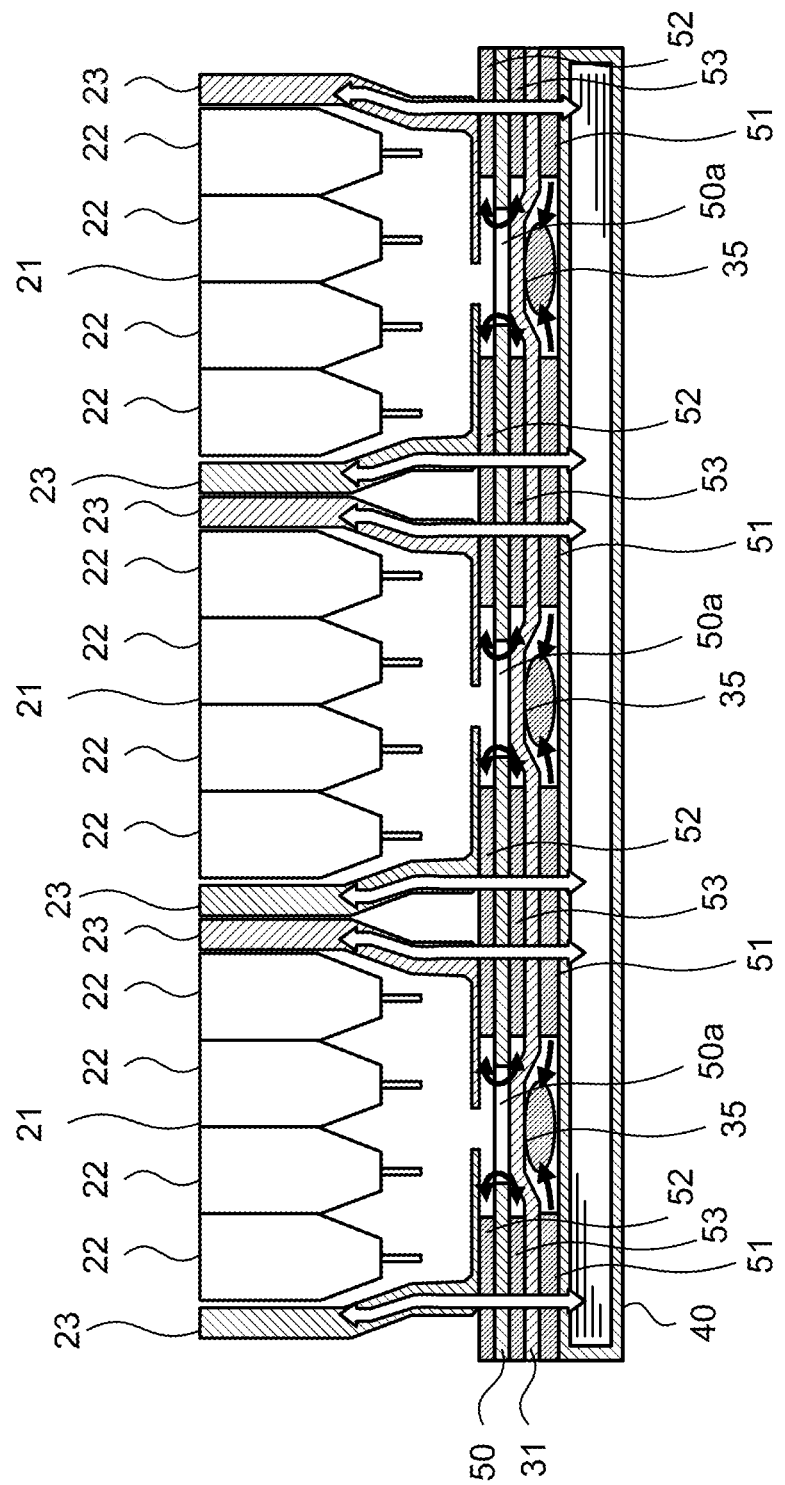
FIG. 3 is a cross-sectional view of major components of the assembled battery according to the embodiment of the present invention.

FIG. 3 is a cross-sectional view of major components of the assembled battery 10 according to the embodiment of the present invention. The cross-sectional view of FIG. 3 illustrates a portion in which the battery unit 20, the heat conductive plate 50, the bottom part 31 of the case, and the cooling plate 40 are in contact with one another. In FIG. 3, white arrows with an outline indicate the movement of heat, and black arrows indicate the movement of the heat transfer material 51, 52, 53.

The battery unit 20 is composed of a plurality of stacked battery modules 21. Each battery module 21 is composed of a plurality of battery cells 22 and a battery case 23 accommodating the plurality of battery cells 22. The battery cases 23 have a function of transferring the heat of the battery cells 22 to the outside.

Each battery cell 22 is connected to two, positive and negative electrode terminals 24 of the corresponding battery module 21 via electric connection to non-illustrated electrode tabs.

In the present embodiment, in order to prevent the above-described deformation of the case 30, the first heat transfer material 51, the second heat transfer material 52, and the third heat transfer material 53 are arranged only in the vicinity of portions where the battery cases 23 for the battery modules 21 are in contact with the heat conductive plate 50. That is to say, as the heat of each battery module 21 of the battery unit 20 is transferred via the corresponding battery case 23, the first heat transfer material 51, the second heat transfer material 52, and the third heat transfer material 53 are arranged in the vicinity of portions where the battery cases 23 are in contact with the heat conductive plate 50, i.e., boundaries between the stacked battery modules 21.

Compared to a case in which a first heat transfer material 51, a second heat transfer material 52, and a third heat transfer material 53 are each arranged as a unified material, the above-described configuration provides room for the heat transfer material to move. Therefore, the above-described configuration suppresses unevenness in the first heat transfer material 51, the second heat transfer material 52, and the third heat transfer material 53, and prevents application of uneven forces to the case 30.

In the embodiment of the present invention, slits 50a are formed in the heat conductive plate 50 so as to make the second heat transfer material 52 and the third heat transfer material 53 movable. The slits 50a permit the second heat transfer material 52 and the third heat transfer material 53, which are respectively provided on a front side and a back side of the heat conductive plate 50, to move between the front side and the back side of the heat conductive plate 50.

The above-described configuration provides room for the second heat transfer material 52 and the third heat transfer material 53 to move to the front side or the back side of the heat conductive plate 50. Consequently, unevenness in the second heat transfer material 52 and the third heat transfer material 53 is suppressed, and application of uneven forces to the case 30 is prevented. Especially, as many voids exist between the front side of the heat conductive plate 50 and the battery unit 20 due to the structure of the battery unit 20, the third heat transfer material 53 located in areas where the back side of the heat conductive plate 50 is in planar contact with the case 30 can move to the front side.

For example, in a case where the first heat transfer material 51, the second heat transfer material 52, and the third heat transfer material 53 are arranged in the vicinity of boundaries between the battery modules 21 as stated earlier, it is favorable to arrange the slits 50a of the heat conductive plate 50 in portions where the second heat transfer material 52 and the third heat transfer material 53 are not arranged, such that the slits 50a extend along a direction perpendicular to the stacking direction of the battery modules 21 of the battery unit 20.

In the embodiment of the present invention, the bottom part 31 of the case 30 is embossed so as to make the first heat transfer material 51 movable. That is to say, depressions are formed in the bottom part 31 so as to permit movement of the first heat transfer material 51.

Specifically, depressions that are recessed toward a direction away from the cooling plate 40 are formed in the bottom part 31 of the case 30, such that the depressions have a predetermined height and are arranged at a predetermined interval. The depressions function as heat transfer material housings 35 that house therein excess first heat transfer material 51 when the first heat transfer material 51 have deformed or flowed by being pressed.

The above-described configuration provides room for excess first heat transfer material 51 to move into the depressions, i.e., the heat transfer material housings 35, especially between the bottom part 31 of the case 30 and the cooling plate 40. Consequently, unevenness in the first heat transfer material 51 is suppressed, and application of uneven forces to the case 30 is alleviated.

In a case where the first heat transfer material 51, the second heat transfer material 52, and the third heat transfer material 53 are arranged in the vicinity of boundaries between contacting battery modules 21 as stated earlier, it is desirable that the embosses formed in the bottom part 31 of the case 30 be upward projections arranged in portions where the first heat transfer material 51, the second heat transfer material 52, and the third heat transfer material 53 are not arranged, such that the upward projections extend along a direction perpendicular to the stacking direction of the battery modules 21 of the battery unit 20.

The above-described configuration prevents unevenness in the first heat transfer material 51, the second heat transfer material 52, and the third heat transfer material 53 of the assembled battery 10, thereby preventing deformation of the case 30 caused by application of uneven forces to the case 30.

As described above, the embodiment of the present invention is applied to the assembled battery including the battery unit 20, the bottomed case 30, the plate-shaped cooling plate 40, and the first heat transfer material 51. The battery unit 20 is composed of the stacked battery modules 21, each of which includes a plurality of battery cells 22. The battery unit 20 is housed in the case 30. The cooling plate 40 is fastened to the bottom part 31 of the case 30 from the outside of the case 30, and can cool the battery unit 20 via the bottom part 31. The first heat transfer material 51 have a plastic property and are held between the bottom part 31 of the case 30 and the cooling plate 40.

The bottom part 31 of the case 30 has the heat transfer material housings 35 that house therein excess first heat transfer material 51 when the cooling plate 40 has been fastened to the case 30.

In the embodiment of the present invention with the above-described configuration, the heat transfer material housings 35 are interposed between the bottom part 31 of the case 30 and the cooling plate 40 so as to provide room for excess first heat transfer material 51 to move into the heat transfer material housings 35. Consequently, unevenness in the first heat transfer material 51 is suppressed, and application of uneven forces to the case 30 is prevented. This suppresses application of uneven forces to the case 30, thereby preventing a reduction in the strength and durability of the case 30.

The heat transfer material housings 35 are depressions that are recessed toward a direction away from the cooling plate 40. As the first heat transfer material 51 move into the depressions, unevenness in the first heat transfer material 51 is suppressed, and application of uneven forces to the case 30 is prevented.

As the first heat transfer material 51 are dispersedly arranged in a plurality of areas between the bottom part 31 of the case 30 and the cooling plate 40, areas where the first heat transfer material 51 are not arranged have room for excess first heat transfer material 51 to move. Consequently, unevenness in the first heat transfer material 51 is suppressed, and application of uneven forces to the case 30 is prevented.

The first heat transfer material 51 are dispersedly arranged in relation to positions of contact between the battery modules 21 of the battery unit 20, more specifically, areas where the battery cases 23 for the battery modules 21 are in opposing contact with each other, such that the first heat transfer material 51 extend along a direction perpendicular to the stacking direction of the battery modules 21. As the first heat transfer material 51 are thus arranged only in areas where they are necessary for transferring the heat of the battery unit 20, areas where the first heat transfer material 51 are not arranged have room for excess first heat transfer material 51 to move. Consequently, unevenness in the first heat transfer material 51 is suppressed, and application of uneven forces to the case 30 is prevented.

The plate-shaped heat conductive plate 50 that conducts heat is interposed between the battery unit 20 and the case 30. The second heat transfer material 52 are held between the battery unit 20 and the heat conductive plate 50. The third heat transfer material 53 are held between the heat conductive plate 50 and the case 30. The heat conductive plate 50 has the slits 50a serving as movement openings that make the second heat transfer material 52 and the third heat transfer material 53 movable between the front side and the back side of the heat conductive plate 50.

The above-described configuration provides room for the second heat transfer material 52 and the third heat transfer material 53 to move to the front side or the back side of the heat conductive plate 50. Consequently, unevenness in the second heat transfer material 52 and the third heat transfer material 53 is suppressed, and application of uneven forces to the case 30 is alleviated.

As the slits 50a of the heat conductive plate 50 are dispersedly arranged in correspondence with positions where the second heat transfer material 52 and the third heat transfer material 53 are not arranged (in relation to positions of contact between the battery modules 21), areas where the second heat transfer material 52 and the third heat transfer material 53 are not arranged have room for excess third heat transfer material 53 and excess second heat transfer material 52 to move. Consequently, unevenness in the second heat transfer material 52 and the third heat transfer material 53 is suppressed, and application of uneven forces to the case 30 is prevented.

The above-described embodiment of the present invention merely illustrates one of example applications of the present invention, and the specific configuration of the above-described embodiment is not intended to limit a technical scope of the present invention.

Although the battery unit 20 composed of a large number of battery cells 22 is accommodated in the case 30 according to the configuration of the above-described embodiment, no limitation is intended in this regard. The above-described embodiment is similarly applicable to a battery unit that is composed of a single battery accommodated in a case and that is provided with the cooling plate 40.

Furthermore, instead of forming the slits 50a in the heat conductive plate 50 and embossing the bottom part 31 of the case 30, slits may be formed in the bottom part of the case 30 and the heat conductive plate 50 may be embossed so as to provide room for the first heat transfer material 51, the second heat transfer material 52, or the third heat transfer material 53 to move.

Embodiments of the present invention were described above, but the above embodiments are merely examples of applications of this invention, and the technical scope of this invention is not limited to the specific constitutions of the above embodiments.

This application claims priority based on Japanese Patent Application No. 2013-148414 filed with the Japan Patent Office on Jul. 17, 2013, the entire contents of which are incorporated into this specification.

The invention claimed is:

1. An assembled battery, comprising:
   a battery unit including stacked battery modules, each battery module including a plurality of battery cells;
   a case configured to house the battery unit therein, the case having a bottom part;
   a plate-shaped cooling plate fastened to the bottom part of the case from an outside of the case, the cooling plate cooling the battery unit via the bottom part of the case; and
   a first heat transfer material having a plastic property and being held between the bottom part of the case and the cooling plate, wherein
   the first heat transfer material is dispersedly arranged in a plurality of areas on a surface of the cooling plate in correspondence with positions of contact between the stacked battery modules of the battery unit, the surface coming in contact with a bottom surface of the case.

2. The assembled battery according to claim 1, further comprising:
   a plate-shaped heat conductive plate interposed between the battery unit and the case, the heat conductive plate conducting heat, wherein
   a second heat transfer material is held between the battery unit and the heat conductive plate,
   a third heat transfer material is held between the heat conductive plate and the case, and
   the heat conductive plate has an opening allowing the second heat transfer material and the third heat transfer material to move between a front side and a back side of the heat conductive plate.

3. The assembled battery according to claim 2, wherein
   the second heat transfer material and the third heat transfer material are provided in correspondence with the positions of contact between the stacked battery unit and,
   the opening of the heat conductive plate is provided in correspondence with positions where the second heat transfer material and the third heat transfer material are not arranged.

4. The assembled battery according to claim 1, wherein
   the bottom part of the case has a heat transfer material housing configured to house an excess portion of the first heat transfer material therein when the cooling plate is fastened to the case.

5. The assembled battery according to claim 4, wherein
   the heat transfer material housing is a depression recessed toward a direction away from the cooling plate.

* * * * *